United States Patent Office 3,542,827
Patented Nov. 24, 1970

3,542,827
10-CYANOACETOXYPHENOXARSINE
Chun-Shan Wang and Thomas W. McGee, Midland, Mich., assignors to The Dow Chemical Company, Midland, Mich., a corporation of Delaware
No Drawing. Filed July 15, 1968, Ser. No. 744,647
Int. Cl. C07d 105/06
U.S. Cl. 260—440                1 Claim

ABSTRACT OF THE DISCLOSURE

New compound 10-cyanoacetoxyphenoxarsine which is useful as a pesticide.

---

The present invention relates to a novel and useful phenoxarsine derivative, namely, 10-cyanoacetoxyphenoxarsine which can be represented by the Formula A:

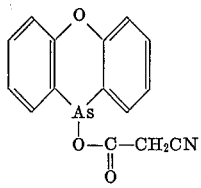

(A)

This compound is a white crystalline solid at room temperature. It is useful as a pesticide for the control of plant and insect pests such as fungal and weed plant species and flies and worms.

The compound of the present invention is prepared by reacting together 10,10'-oxybisphenoxarsine and cyanoacetic acid. The reaction proceeds smoothly at temperatures of from about 20° C. to 200° C. and conveniently at the boiling point of the reaction mixture and under reflux. The reaction is conveniently conducted in liquid reaction medium. Suitable media include benzene, toluene, dimethylformamide, dimethylacetamide, methylene chloride, tetrahydrofuran, ethanol, hexane, and so forth. The amounts of the reactants employed are not critical, some of the desired product being formed when employing any proportions of reagents. However, the reaction consumes the reagents in the proportion of two moles of cyanoacetic acid per mole of 10,10'-oxybisphenoxarsine and the employment of such proportions is usually preferred. The reaction can advantageously be conducted utilizing an excess over that consumed of the cyanoacetic acid ranging upwards of a 50 percent molar excess. The employment of larger excess cyanoacetic acid is not desirable from the standpoint of economy.

In conducting the reaction, the 10,10'-oxybisphenoxarsine, cyanoacetic acid, and liquid reaction medium, if employed, are mixed with one another in any convenient order or fashion. In a preferred manner, the 10,10'-oxybisphenoxarsine is added to a solution of cyanoacetic acid dispersed in liquid reaction medium. The reactants are then maintained together within the given temperature range for a period of time sufficient to complete the reaction. The reaction mixture is then conventionally processed to separate and isolate product. Such processing includes filtration, extraction, distillation, chromatography, and the like.

The following example illustrates the present invention but, as such, is not to be considered as limiting.

EXAMPLE

Cyanoacetic acid (4.25 grams; 0.0500 mole) is dispersed in 250 milliliters of benzene at room temperature. 10,10'-oxybisphenoxarsine (12.6 grams; 0.0251 mole) is added to the resultant solution with stirring. The resulting mixture is heated to the boiling point and maintained at such for 24 hours with vigorous stirring. During this period, a constant boiling azeotropic mixture of the water of reaction and benzene is continuously distilled, the water of reaction is separated, and the benzene is recycled to the reaction mixture. Following the heating period, the remaining reaction mixture is filtered and the filtrate is concentrated by evaporation to dryness. The residual solid is recrystallized from nitromethane to obtain the 10-cyanoacetoxyphenoxarsine product as a white crystalline solid melting at from 94°–97° C.

The compound of the present invention is useful as a pesticide for the control of a wide variety of plant and insect pests such as Bacillus subtilis, Aspergillus terreus, pigweeds, bindweed, flies, roaches, and mosquitoes. For such use, the unmodified compound can be employed. Alternatively, the compound can be dispersed on an inert finely divided solid to prepare dust compositions. The latter dust compositions can be dispersed in water with or without the aid of a wetting agent and the resulting aqueous dispersions employed as sprays. In other procedures, the compound can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of the compound hereof. Generally, these amounts range from about 1 to about 5000 parts per million of the compound.

In representative operations, 10-cyanoacetoxyphenoxarsine gives complete controls and kills of the organisms Candida albicans, Trichophyton mentagrophytes, Bacillus subtilis, Aspergillus terreus, Candida pelliculosa, and Pullularia pullulans when the named compound is separately applied to the environments containing and supporting thriving members of one of such organisms at a concentration of 500 parts per million, by weight.

In further operations, 10-cyanoacetoxyphenoxarsine gives substantially complete controls and kills of pigweds when applied to the growth medium of such at pre-emergent stages via drenches with aqueous compositions containing the named compound as the sole toxicant at a dosage of ten pounds per acre.

In additional operations, 10-cyanoacetoxyphenoxarsine gives substantially complete controls and kills of yellow fever mosquitoes when such are contacted with aqueous compositions containing the named compound at a concentration of five parts per million by weight.

What is claimed is:
1. 10-cyanoacetoxyphenoxarsine.

References Cited

UNITED STATES PATENTS

| 2,767,114 | 10/1956 | Urbschat et al. | 260—440 X |
| 3,036,107 | 5/1962 | Dunbar | 260—440 |
| 3,038,921 | 6/1962 | Strycker et al. | 260—440 |
| 3,149,133 | 9/1964 | Strycker et al. | 260—440 X |
| 3,197,494 | 7/1965 | Strycker | 260—440 |
| 3,197,495 | 7/1965 | Strycker | 260—440 |

HELEN M. McCARTHY, Primary Examiner
W. F. W. BELLAMY, Assistant Examiner

U.S. Cl. X.R.
424—297